April 8, 1969   D. P. WHITACRE ET AL   3,437,114
MACHINE FOR MAKING A WIRE CAGE
Filed Oct. 27, 1966

INVENTORS.
DONALD P. WHITACRE
VICTOR E. HASS
BY
ATTORNEYS

INVENTORS.
DONALD P. WHITACRE
VICTOR E. HASS
BY Lyon & Lyon
ATTORNEYS

United States Patent Office 3,437,114
Patented Apr. 8, 1969

3,437,114
MACHINE FOR MAKING A WIRE CAGE
Donald P. Whitacre, 1013 N. Margarita Ave., Alhambra,
Calif. 91801, and Victor E. Hass, La Puente, Calif.;
said Hass assignor to said Whitacre
Filed Oct. 27, 1966, Ser. No. 590,007
Int. Cl. B21f 15/08, 27/10
U.S. Cl. 140—112                    16 Claims

ABSTRACT OF THE DISCLOSURE

A reinforcing wire cage, comprising a helix wire enclosed within separate longitudinal wires, is formed by a machine having a flyer with a hollow shaft mounted to rotate on a stationary support. The longitudinal wires are advanced axially, and the helix wire is fed through the hollow shaft and is deflected by rollers on the flyer into a circumferential path within the longitudinal wires. Welding devices join the helix wire to each of the longitudinal wires to form the cage, and a brake impedes rotation of the flyer. The diameter of the wire cage is controlled by adjusting the radial position of the advancing devices for the longitudinal wires.

---

This invention relates to apparatus for making reticulated wire structures and is particularly directed to a machine for making a wire reinforcing cage to be embedded in a concrete member such as a pipe, a post or other concrete structure.

Prior machines for making reinforcing wire cages of this general type have been cumbersome, relatively inflexible, and expensive. Such machines commonly employed collapsible mandrels for the cage, or required that the spools for the wire to form the cage be mounted on a common rotating support. Cages of widely differing diameters or shapes could not be produced from a single machine.

Among the objects of this invention are to provide a machine for making wire reinforcing cages in which the wire supply spools may rest individually on the floor and need not be mounted on a common rotating support; to provide such a machine which employs a novel form of rotary flyer device for putting the helix wire in place prior to welding, the flyer being powered only by the infeed of the helix wire, and wherein a brake is supplied to impede rotation of the rotary flyer; to provide a machine with a wide range of adjustment to accommodate different sizes of cages and for various shapes of cages; to provide a machine in which the cage under construction moves axially away from the forming mechanism, but does not turn; and to provide a machine of this type employing a novel form of mounting for the welding mechanisms which join the helix wire to the longitudinal wires.

Briefly stated, these and other objects of the invention are achieved by providing a machine having a rotary flyer mounted to turn on a stationary support, feed means for moving the helix wire axially through a hollow shaft supporting the rotary flyer, deflecting elements on the rotary flyer for directing the helix wire into a circumferential path around the shaft axis, advancing means for axially moving the longitudinal wires, and welding means for joining the helix wire to each of the longitudinal wires to form a cage.

In the drawings, FIGURE 1 is a rear elevation showing a preferred embodiment of this invention.

FIGURE 4 shows a portion of FIGURE 3 on an enlarged scale.

FIGURE 5 is a front elevation partly broken away, taken substantially on the lines 5—5 as shown in FIGURE 4.

Figure 1:
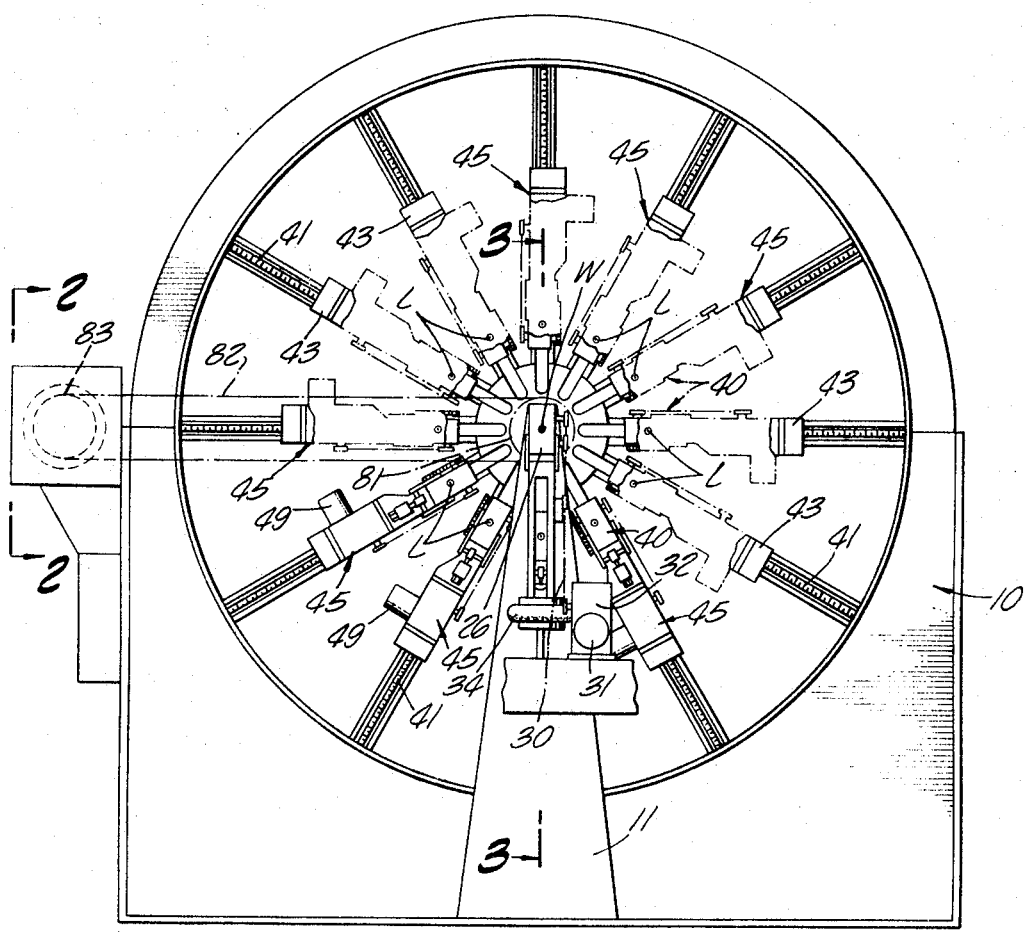
Figure 2:
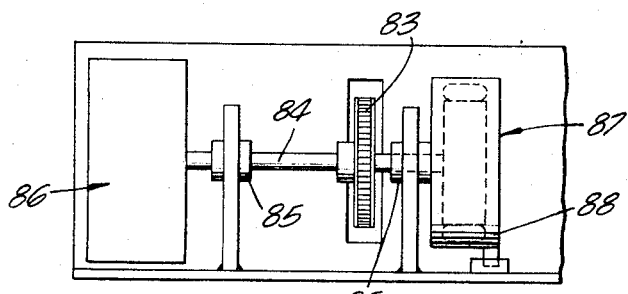
FIGURE 2 is a side elevation showing a portion of the device, taken in the directions of the lines 2—2 as shown in FIGURE 1.

Referring to the drawings, the cage making machine includes a support member generally designated 10 resting on the floor, and including as a portion thereof a pedestal 11. A plurality of longitudinal wires L and a single helix wire W pass through the support member 10, moving from right to left as viewed in FIGURES 3 and 4.

The helix wire W passes through the interior of a hollow shaft 12 which is rotatably mounted on the support member by means of axially spaced bearings 13 and 14. The bearing 13 is mounted centrally of the support member 10 and the bearing 14 is carried at the upper end of the pedestal 11. A rotary flyer assembly 16 is connected by flanges 17 to the forward end of the hollow rotary shaft 12, and is supported thereby. The helix wire W is engaged by the grooved rollers 18, 19, 20, 21 and 22 mounted on the rotary flyer 16, which rollers direct the helix wire into a circumferential path encircling the shaft axis 23.

Feed means are provided for passing the helix wire W through the hollow shaft 12, and as shown in the drawings, this means includes feed rollers 24 and 25 mounted in a housing 26 carried at the upper end of the pedestal 11. The feed roller 25 is mounted on a swinging arm 27 pivoted at 28 so that it may be moved toward and away from the feed roller 24. A belt or chain 30 drives the feed rollers 24 and 25 in opposite directions, and receives power from a variable-speed motor 31 driving through a reduction gear 32. An idler 33 maintains proper tension in the belt or chain 30. A resilient member 34 containing air under pressure acts through strut 35 and pivot 36 to swing the arm 27 and thereby control the pressure between the feed rollers 24 and 25. The intensity of air pressure within the resilient member 34 is controlled through the air tube 37. The rate of feed of the helix wire W is regulated by controlling the speed of the drive motor 31.

Figure 3:
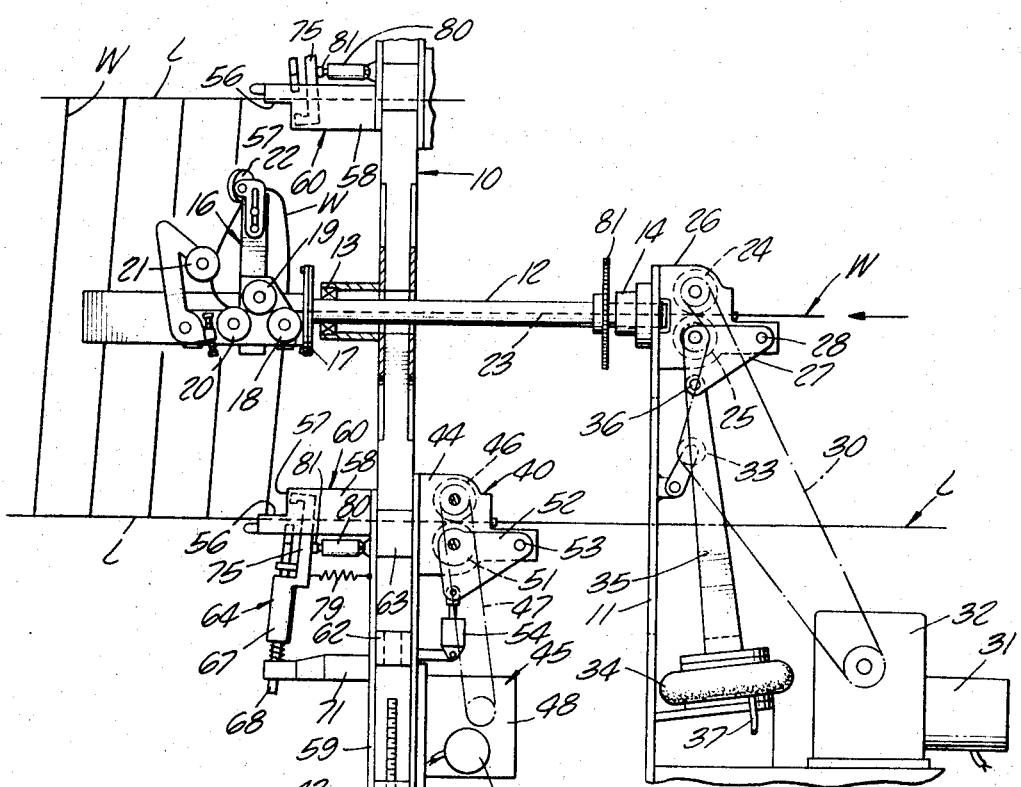
FIGURE 3 is a sectional detail taken substantially on the lines 3—3 as shown in FIGURE 1.

Means are provided for advancing the longitudinal wires L axially through the support member 10, and as shown in the drawings this means includes a plurality of power advance assemblies generally designated 40. One of these assemblies is provided for each of the longitudinal wires L. As best shown in FIGURES 1 and 3, each of these assemblies 40 is mounted for radial adjustment on the stationary support member 10. A radial adjustment screw 41 is received within a threaded nut 42 which slides in a radial guideway provided on the support. The nut 42 is connected to the mounting plate 43 which carries the drive roller housing 44 and a power unit 45. The drive roller 46 receives power via chain or belt 47 from the reduction gear 48 which forms a part of the power unit 45. A variable speed motor 49 drives the reduction gear unit 48. The drive roller 51 is mounted on a swinging arm 52 pivoted at 53 to the housing 44. A fluid actuated power cylinder assembly 54 swings the arm 52 about the pivot 53 to control the pressure between the feed rollers 46 and 51. One of the longitudinal wires L passes between the feed rollers on each of the units 40, respectively, and the speed of the drive motor 49 controls the axial feed of each of these longitudinal wires L. In practice, all of the motors 49 are driven at the same speed so that the longitudinal wires L are all advanced at the same rate. Clamp means (not shown) are provided for securing each of the units 40 in adjusted position on the support member 10.

It will be observed that the helix wire W is placed inside the longitudinal wires L, rather than on the outside of such longitudinal wires. While it is possible to direct the helix wire from the last roller 22 on the rotary flyer directly against each of the longitudinal wires L in sequence, as the flyer 16 turns, it is preferred to direct the helix wire W from the flyer 16 against a plurality of axially extending abutments 56. A pair of abutments 56 is provided for each longitudinal wire L as shown in FIGURE 5. The helix wire W leaving the angular roller 22 on the rotary flyer 16 is limited in its movement radially outward by contact with these axially extending abutments 56. Axial motion of the helix wire toward the support 10 is limited by contact with radial shoulders 57 which extend inward from the abutments 56. The shoulders 57 are contained in the same radial plane at right angles to the axis 23 of the hollow shaft 12.

The abutments 56 and shoulders 57 are formed as a part of parallel side plates 58 fixed to the base plate 59 on each of the resistance welding assemblies generally designated 60. One of these welding assemblies 60 is provided for each of the longitudinal wires L. The base plate 59 of each of these assemblies 60 is mounted for radial adjustment on the stationary support member 10. The base plates 59 and 43 may conveniently be connected by slide blocks 62 and 63 for unitary adjusting movement by means of the adjusting screw 41 and cooperating nut 42.

Each of the welding assemblies 60 includes a welding gun 64 having contacts 65 and 66 for resistance welding the helix wire W to each of the longitudinal wires L. The electrical circuits for the resistance welding operation are not shown, but they are conventional. Each welding gun 64 is provided with a housing 67 having an integral stem 68 projecting from its outer end. Each stem 68 passes loosely through an opening 69 in a plate 70 carried on a bracket 71 fixed to the base plate 59. A spring 73 encircles the stem 68 and serves to support the welding gun 64 on the plate 70. A collar 74 prevents movement of the welding gun radially inwardly.

Figure 7:
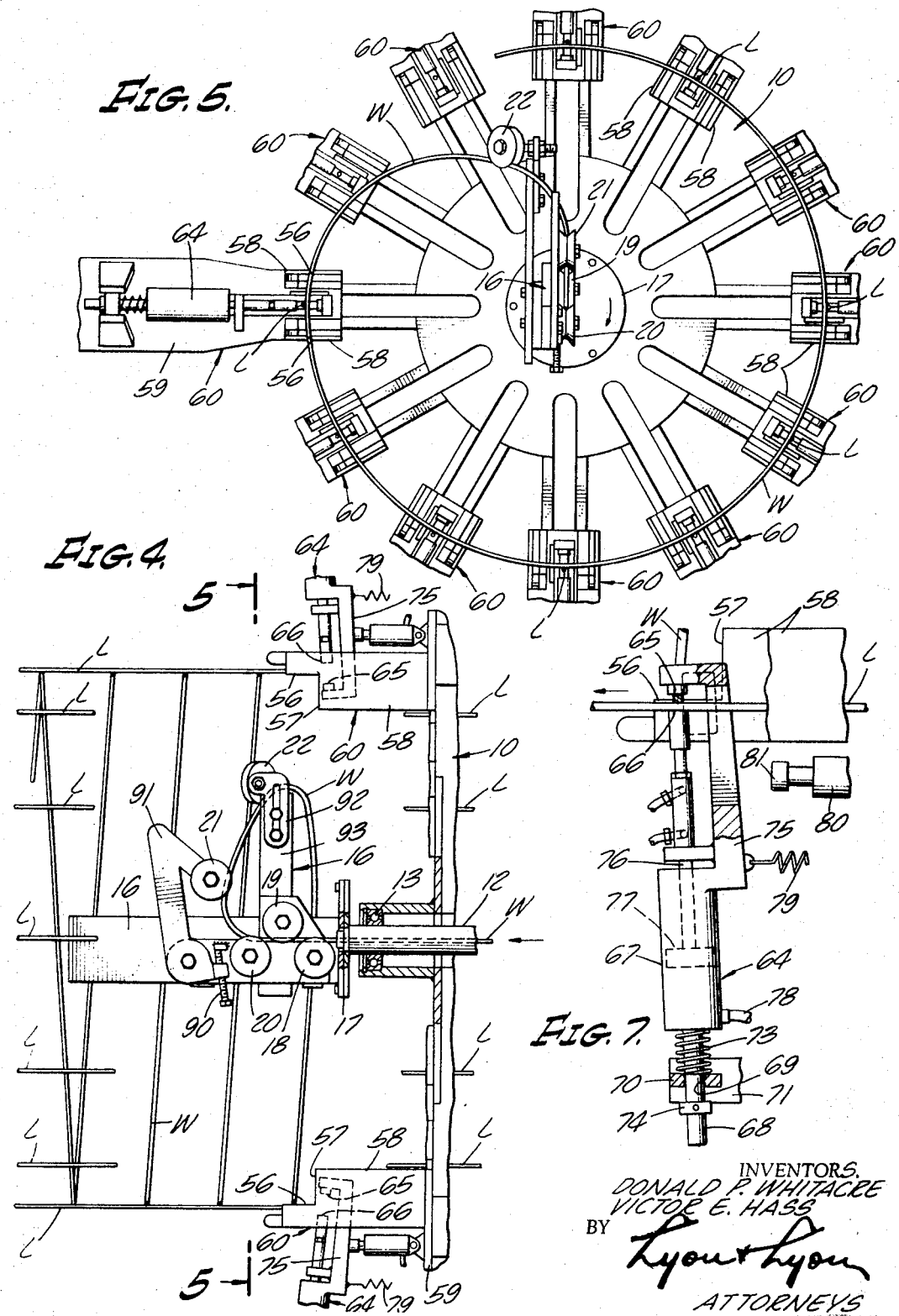
FIGURE 7 is a view similar to FIGURE 6 but showing the resistance welding gun in operating position.

A C shaped yoke 75 is fixed on the housing 67 and supports the electrical contact 65. The other contact 66 is mounted for relative movement on the housing 67 and is carried on the extending end of a piston rod 76 connected to piston 77. A coolant connection 78 of the usual type may be provided for cooling either or both of the contacts 65 and 66. When fluid under pressure is supplied to the interior of the housing 67 through the connection 78, the piston 77 and rod 76 are moved radially inward with respect to the housing 67 and yoke 75. When the contact 66 engages the longitudinal wire L, as shown in FIGURE 7, fluid pressure acting on the piston 77 causes the housing 67 to move radially outward against the force of the spring 73, thereby bringing the electrical contact 65 into engagement with the helix wire W, and causing the helix wire W to be clamped under pressure against the longitudinal wire L. At this time an electric welding current is caused to pass between the contacts 65 and 66, thereby producing a resistance weld between the helix wire W and the longitudinal wire L. The longitudinal wire L continues to move continuously during the welding cycle, and accordingly the welding gun 64 pivots on its support plate 70 during the clamping operation and welding cycle. When the weld cycle is complete, fluid pressure acting against the piston 77 is relaxed to permit the contacts 65 and 66 to move away from the wires W and L.

Figure 6:
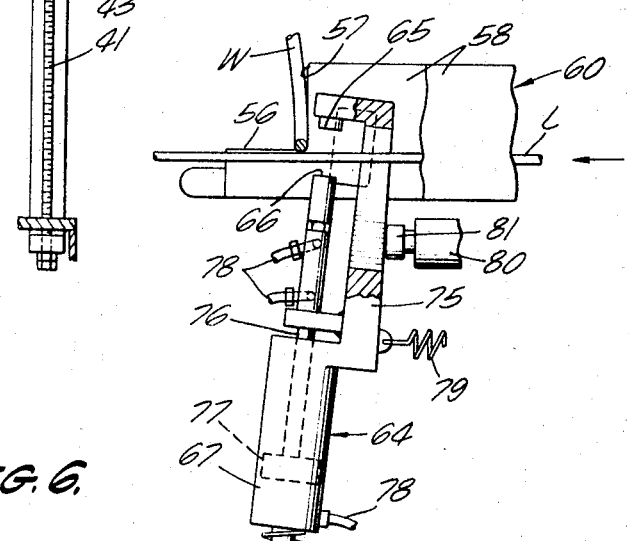
FIGURE 6 is a side elevation partly in section showing one of the resistance welding guns in retracted position.

A tension spring 79 extends between the yoke 75 and the base plate 59 and serves to retract the welding gun from the position shown in FIGURE 7 to the position shown in FIGURE 6. In the retracted position of FIGURE 6, all parts of the welding gun 64 and contacts 65 and 66 are behind the radial shoulders 57 and outward of the abutments 56 to provide clearance for the helix wire W. Initial movement of the welding gun from the position shown in FIGURE 6 to an operative position in which the wires W and L are confined between the electrical contacts 65 and 66 is accomplished by means of a fluid pressure cylinder assembly 80 mounted on the base plate 59 and having a laterally movable head 81 which contacts the yoke 75. When fully extended, the head 81 swings the welding gun 64 so that its electrical contacts are aligned with the helix wire W lying against the radial shoulders 57.

The welded joint formed between the helix wire W and the longitudinal wire L causes the helix wire to move with the longitudinal wire L, and the helix wire W is thereby given a generally helical shape as it is welded successively in turn to each of the moving longitudinal wires L. Suitable timing mechanism is provided for energizing each of the welding assemblies in turn, as the helix wire sequentially contacts the abutments 26 on each assembly 60. As shown in FIGURE 5, the welding assemblies 60 are energized sequentially in a clockwise direction. As shown in the drawings, this mechanism includes a sprocket 81 fixed to the hollow shaft 12. An endless chain 82 (FIGURE 1) connects this sprocket to another sprocket 83 mounted on the support 10 at one side of the hollow shaft 12. This sprocket 83 is fixed to a stub shaft 84 mounted in spaced bearings 85. A timer device generally designated 86 is mounted on one end of the stub shaft 84. While the details of the timer 86 are not shown, it will be understood that rotation of the stub shaft 84 causes each of the welding assemblies 60 to be energized in sequence. Moreover, energizing of any one welding assembly 60 is effective to cause its fluid pressure cylinder 80 to swing the welding gun from the retracted position shown in FIGURE 6 to its initial operating position, with the contacts aligned with the helix wire W, to admit pressure fluid through fitting 78 to pressurize the piston 77 and thereby clamp the wires W and L between the electrical contacts 65 and 66, to cause a timed flow of electrical energy across the electrical contacts 65 and 66 to produce the resistance weld, and then to relax the pressure in the assembly 80 and within the housing 67 to permit the welding gun 64 to return to the retracted position shown in FIGURE 6, by the action of the spring 79.

A friction brake 87 is mounted on the other end of the stub shaft 84. The friction brake 87 has a housing 88 which is restrained from rotating. The brake 87 acts as a drag to impede rotation of the rotary flyer 16. It will be observed that the flyer 16 is caused to rotate only by the in-feed of the helix wire W, driven by the feed rollers 24 and 25. The grooved rollers 18, 19, 20, 21 and 22 mounted on the rotary flyer 16 are positioned to direct the wire into a circumferential path and into sequential contact with the radial abutments 56. The reaction forces of the helix wire W as it is deflected apply a torque to the flyer 16. The particular path of the helix wire may be changed by moving the adjusting screw 90 to change the position of the arm 91 and the roller 21. Moreover, the position of the slanted roller 22 may be changed by moving its supporting bracket 92 with respect to the arm 93 on the flyer 16.

Figure 8:
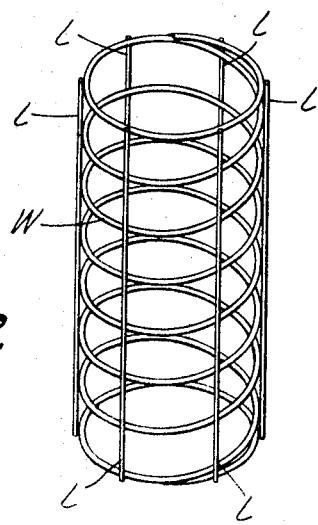
FIGURES 8, 9, 10 and 11 are diagrammatic illustrations showing various types of reinforcing wire cages which may be made by the machine.

The machine can be used to construct any one of the types of reinforcing wire cages shown in FIGURES 8, 9, 10 and 11. Assuming that a cage of the type shown in FIGURE 8 is to be constructed, comprising a straight cylinder with squared ends, the power advance assemblies 40 are energized simultaneously to cause the longitudinal wires L to be advanced in an axial direction. Conventional supply reels (not shown) for each of the longitudinal wires may be mounted on the floor or otherwise supported at any convenient location. For large diameter cages, it is preferred to use 12 longitudinal wires L, although only 6 longitudinal wires are shown in FIGURE 8, for clarity of illustration. The longitudinal wires L move continuously and after they project for a sufficient distance beyond the stationary support 10, the feed rollers 24 and 25 for the helix wire W are energized to feed the helix wire axially through the hollow shaft 12 and through the grooved rollers on the rotary flyer 16 in the manner shown. The projecting end of the helix wire W is moved manually into engagement with two of the abutments 56 and against the adjacent shoulders 57. The flyer 16 then begins to turn automatically by reaction torque and the speed of turning movement of the flyer 16 is limited by the brake 87. All of the welding guns 64 remain in retracted position as shown in FIGURE 6.

After almost one revolution of the flyer 16 has taken place to position the helix wire W in contact with all but one or two of the pairs of abutments 56 and in contact with the radial shoulders 57, the timer mechanism 86 is energized to cause sequential actuation of each of the welding assemblies 60. The major portion of the first turn of the helix wire W remains unwelded to the longitudinal wires L but from that point on the welding guns 64 operate in sequence to form resistance weld between the helix wire W and the continuously moving longitudinal wires L. After each weld is complete, the particular welding gun 64 releases the welded joint and returns from the welding position shown in FIGURE 7 to the retracted position shown in FIGURE 6. That particular welding gun is not actuated again until the helix wire W has made another complete revolution. The axial lead of the helix wire W, that is, that axial distance between adjacent loops or turns, is controlled by the relative speed of the motor 31 which drives the feed rollers 24 and 25 for the helix wire W, as compared to the speed of the motors 49 which drive each of the advancing mechanisms 40 for the longitudinal wires L.

As the cage under construction moves away from the stationary support 10, it does not turn and may conveniently be supported by any convenient device, not shown. When the cage has reached the desired length, the timer 86 is de-energized to interrupt the welding operations, but the longitudinal wires L continue to be fed axially by the power advance assemblies 40, and the helix wire W continues to be fed by the rollers 24 and 25 until almost one complete unwelded turn of helix wire has been produced. The power advance assemblies 40 are then shut off by cutting off the supply of electrical current to the motors 49. The helix wire feed is stopped by cutting off the supply of electrical current to the motor 31. The helix wire W is then cut by a torch or any other convenient means near the end of its last unwelded turn and each of the longitudinal wires L is similarly cut in the same transverse plane. The first and last unwelded turns of the helix wire W are then hand welded to the longitudinal wires L to form the squared ends of the completed cage.

An endless series of cylindrical cages may be constructed, each cage with its first and last turn of the helix wire W being unwelded, by interrupting the welding operation each time a cage reaches the desired length, and then continuing the welding operation when sufficient length of unwelded helix wire has accumulated to supply square ends for the rearward end of one cage and the beginning end of the next cage. In this way, a succession of cages can be formed without interrupting the continuous movement of the longitudinal wires L, so long as the supply of wire lasts.

The machine may also be used to produce the cylindrical cages with squared ends, as shown in FIGURE 8, without requiring manual welding of the first and last turns of the helix wire W. This is accomplished by beginning the sequential welding operation while the longitudinal wires L are stationary and before the power advance assemblies 40 are energized. In this way the first turn of the helix wire W occurs in the same transverse plane, with the helix wire in contact with the radial shoulders 57. As soon as the first turn has been completed the power advance assemblies 40 are energized, thereby causing the helix wire W to take the general shape of a helix. When the desired length of the cage has been achieved, the power advance assemblies are shut off and the last turn of the helix wire W takes place in the same plane, as before. If desired, a series of cages of this type can be constructed end to end, as described above, and the cages later separated by cutting the longitudinal wires L and helix wire W.

Figure 9:
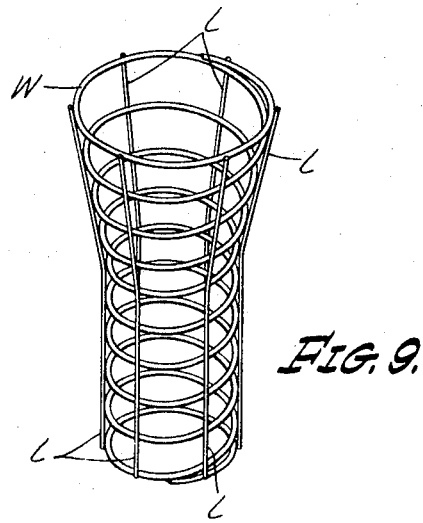

The cage shown diagrammatically in FIGURE 9 is similar to that shown in FIGURE 8 except that one end is flared or conical. This form of cage is constructed in the same manner as described above, except that the adjusting screws 41 are turned during the operation of the machine to move the power advance assemblies 40 and welding assemblies 60 radially on the stationary support member 10 while the longitudinal wires L are being fed. Also, some adjustment of the rollers 21 and 22 on the flyer 16 may be required in order that the helix wire W seat properly on the abutments 56 and radial shoulders 57 throughout the range of radial movement required. Turning of the adjusting screws 41 simultaneously may be accomplished in any desired manner and power means may be supplied for this operation if desired.

Figure 10:
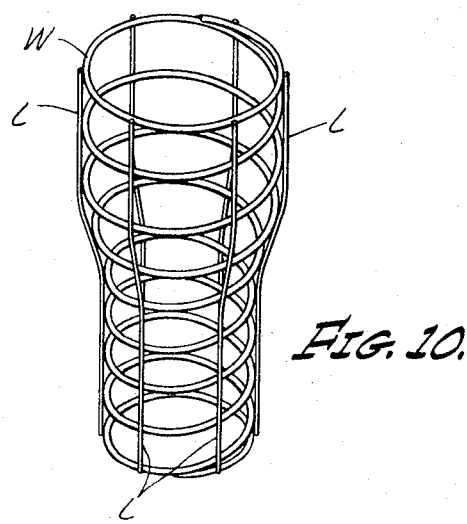

FIGURE 10 shows another form of reinforcing wire cage which may be constructed by the machine. This cage comprises a large cylindrical portion and a smaller cylindrical portion joined by a tapering section, and is used for bell end concrete pipe. The large diameter section and the small diameter section are formed in the manner described in connection with FIGURE 8, and the intermediate tapering section is formed by actuation of the adjusting screws 41 as described in connection with FIGURE 9.

Figure 11:
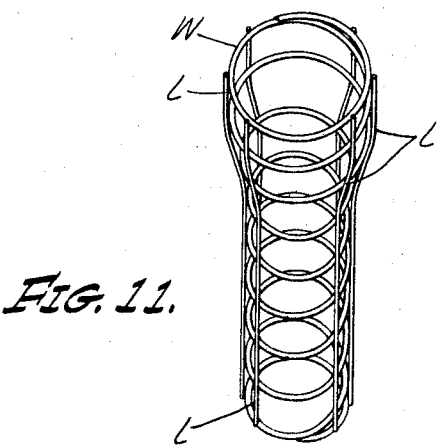
Figure 12:
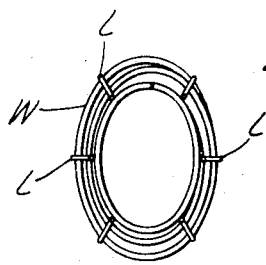
FIGURE 12 is an end view of the cage shown in FIGURE 11.

The reinforcing wire cage shown in FIGURES 11 and 12 is elliptical in cross section, rather than round. Cages of this type are used in concrete pipe with the long axis of the ellipse in vertical position, in order to increase resistance to vertically applied loads on the pipe. In order to produce this form of cage, the adjusting screws 41 are initially moved so that the abutments 56 on the assemblies 60 define an ellipse of the desired size. The cage may have the same cross section throughout its length, or may be provided with a bell end, as shown. In the latter case, the adjusting screws 40 are turned to produce the tapering sections, as described in connection with FIGURE 9, while the large and small portions of the cage are produced in the manner described in connection with FIGURE 8.

Having fully described our invention, it is to be understood that we are not to be limited to the details herein set forth, but that our invention is of the full scope of the appended claims.

We claim:

1. In a machine for making a wire reinforcing cage to be embedded in a concrete member, the combination of: a stationary support, means on said support for longitudinally advancing a group of longitudinal wires each in a direction having an axial component the longitudinal wires defining the cage boundary, a flyer mounted to rotate on said support and having a hollow shaft, feed means for moving a helix wire axially through said hollow shaft, deflecting means on said flyer for directing said helix wire into a circumferential path around the shaft axis and within said longitudinal wires, and welding means for joining said helix wire to each of the longitudinal wires in said group to form a cage.

2. The combination set forth in claim 1 in which the longitudinal wires are parallel and are advanced in an axial direction.

3. The combination set forth in claim 1 in which the feed means for the helix wire and the advancing means for the longitudinal wires operate continuously and simultaneously.

4. The combination set forth in claim 1 including an energy-absorbing device for impeding rotation of said flyer.

5. The combination set forth in claim 1 including a brake mounted on said stationary support, and means operatively connecting said brake to said hollow shaft of the flyer.

6. In a machine for making a wire reinforcing cage to be embedded in a concrete member, the combination of: a stationary support, means on said support for longitudinally advancing a group of longitudinal wires each in a direction having an axial component the longitudinal wires defining the cage boundary, a flyer having a hollow shaft, bearing means mounted on the support for supporting said hollow shaft, feed means for moving a helix wire axially through said hollow shaft, deflecting means including rollers on said flyer for directing said helix wire into a circumferential path around the shaft axis and within said longitudinal wires, a brake mounted on said stationary support at one side of said hollow shaft, means operatively connecting said brake to said hollow shaft, and means for varying the rate of feed of the helix wire with respect to the rate of advancing the longitudinal wires, and welding means for joining said helix wire to each of the longitudinal wires in said group to form a cage.

7. In a machine for making a wire reinforcing cage to be embedded in a concrete member, the combination of: a stationary support, means on said stationary support for longitudinally advancing a group of longitudinal wires each in a direction having an axial component the longitudinal wires defining the cage boundary, a flyer mounted to rotate on said support and having a hollow shaft, feed means for moving a helix wire axially through said hollow shaft, a plurality of inward facing abutments mounted on the stationary support, each of the abutments being positioned adjacent one of said longitudinal wires, respectively, deflecting means on said flyer for directing the helix wire outward into sequential contact with said abutments, and welding means for joining said helix wire to each of the longitudinal wires in said group to form a cage with the helix wire within the longitudinal wires.

8. The combination set forth in claim 7 in which the longitudinal wires are parallel and are advanced in an axial direction.

9. The combination set forth in claim 7 in which the feed means for the helix wire and the advancing means for the longitudinal wires operate continuously and simultaneously.

10. The combination set forth in claim 7 including brake means for impeding rotation of said hollow shaft.

11. The combination set forth in claim 7 in which means are provided for radially adjusting the position of said abutments, said advancing means and said welding means, relative to said stationary support.

12. The combination set forth in claim 7 in which the abutments are mounted in pairs, each pair straddling one of the longitudinal wires, respectively, and wherein the welding means includes a resistance welding gun mounted between each respective pair of the abutments.

13. In a machine for making a wire reinforcing cage to be embedded in a concrete member, the combination of: a stationary support, a flyer mounted to rotate on said support and having a hollow shaft, feed means for moving a helix wire axially through said hollow shaft, means on said stationary support for longitudinally advancing a group of longitudinal wires in an axial direction the longitudinal wires defining the cage boundary, a plurality of inward facing abutments mounted on the stationary support, each of the abutments being positioned adjacent one of said longitudinal wires, respectively, and each having an adjacent radial shoulder, deflecting means on said flyer for directing the helix wire outward into sequential contact with said abutments and radial shoulders, welding means for joining said helix wire to and within each of the longitudinal wires in said group to form a cage with the helix wire inside the longitudinal wires, said welding means including a resistance gun for each of the longitudinal wires, respectively, and means for moving each welding gun from a retracted position providing clearance for the helix wire in contact with the abutment and shoulder to an operative position for contacting the helix wire and its respective longitudinal wire.

14. The combination set forth in claim 13 in which the advancing means for the longitudinal wires operate continuously and wherein each welding gun moves relative to said stationary support with its respective longitudinal wire during its welding cycle.

15. In a machine for making a wire reinforcing cage to be embedded in a concrete member, the combination of: a stationary support, means on said support for longitudinally advancing a group of longitudinal wires each in a direction having an axial component the longitudinal wires defining the cage boundary, a flyer mounted to rotate on said support and having a hollow shaft, feed means for moving a helix wire axially through said hollow shaft, deflecting means on said flyer for directing said helix wire into a circumferential path around the shaft axis and within said longitudinal wires, said feed means supplying a force to said helix wire which acts on the deflecting means to apply torque acting to rotate the flyer.

16. The combination set forth in claim 15, including an energy-absorbing device for impeding rotation of said flyer.

References Cited

UNITED STATES PATENTS

| | | | |
|---|---|---|---|
| 1,928,534 | 9/1933 | Halkyard et al. | 140—112 |
| 2,050,832 | 8/1936 | Edwards | 140—112 |
| 3,125,132 | 3/1964 | Knisely | 140—112 |
| 3,209,793 | 10/1965 | Miura | 140—112 |
| 3,215,169 | 11/1965 | Silliman et al. | 140—112 |
| 3,233,638 | 2/1966 | Silliman et al. | 140—112 |
| 3,250,888 | 5/1966 | Olivier et al. | 140—112 |
| 3,254,681 | 6/1966 | Magers | 140—112 |
| 3,280,855 | 10/1966 | Magers | 140—112 |
| 3,310,074 | 3/1967 | Huck et al. | 140—112 |

CHARLES W. LANHAM, *Primary Examiner.*

E. M. COMBS, *Assistant Examiner.*

U.S. Cl. X.R.

140—71